(12) United States Patent
Shmilovich et al.

(10) Patent No.: US 12,222,221 B2
(45) Date of Patent: Feb. 11, 2025

(54) SYSTEM AND METHODS OF MEASURING PROPERTIES OF FLUIDS

(71) Applicant: EZMEMS LTD, Caesarea (IL)

(72) Inventors: Tsvi Shmilovich, Pardes Hanna-Karkur (IL); Nicola Molinazzi, Kfar Sava (IL)

(73) Assignee: EZMEMS LTD, Caesarea (IL)

( * ) Notice: Subject to any disclaimer, the term of this patent is extended or adjusted under 35 U.S.C. 154(b) by 227 days.

(21) Appl. No.: 17/787,718

(22) PCT Filed: Dec. 20, 2020

(86) PCT No.: PCT/IL2020/051310
§ 371 (c)(1),
(2) Date: Jun. 21, 2022

(87) PCT Pub. No.: WO2021/124339
PCT Pub. Date: Jun. 24, 2021

(65) Prior Publication Data
US 2023/0332933 A1    Oct. 19, 2023

Related U.S. Application Data

(60) Provisional application No. 62/951,773, filed on Dec. 20, 2019.

(51) Int. Cl.
*B67D 1/00* (2006.01)
*B67D 1/08* (2006.01)
(Continued)

(52) U.S. Cl.
CPC ......... *G01D 11/245* (2013.01); *B67D 1/0855* (2013.01); *B67D 1/0888* (2013.01); *G01F 1/44* (2013.01)

(58) Field of Classification Search
CPC ................... G01D 11/245; G01F 1/44
See application file for complete search history.

(56) References Cited

U.S. PATENT DOCUMENTS 5,770,805 A * 6/1998 Castel ............... G01N 33/2823
73/861.04
6,250,164 B1 * 6/2001 O'Brien ............... G01L 9/0002
604/153
(Continued)

FOREIGN PATENT DOCUMENTS

CN    101512298 A  *  8/2009  .............. G01F 1/363
CN    104220851 B  *  11/2018  ............... G01F 1/34
(Continued)

*Primary Examiner* — Jamel E Williams
(74) *Attorney, Agent, or Firm* — FISHERBROYLES, LLP; Roger L. Browdy; James E. Mrose

(57) ABSTRACT

A multi-sensor device is disclosed, for monitoring in real time a flowing fluid substance, the device comprises a main body structure having at least one fluid port and fluid passage for receiving a stream of the fluid substance and flowing it through the fluid passage, and one or more openings for establishing fluid communication with the fluid passage, a sensing foil/film having one or more sensor elements, wherein each portion of the sensing foil/film having at least one of the sensor elements is in fluid communication with at least one of the openings, to thereby enable the sensing element to measure at least one property of condition of the fluid and generate sensor data/signals indicative thereof. The main body structure and the sensing assembly attached to it constitute an integrated component configured as an insertable and removable/exchangeable element of the device.

20 Claims, 7 Drawing Sheets

(51) Int. Cl.
*G01D 11/24* (2006.01)
*G01F 1/44* (2006.01)

(56) References Cited

U.S. PATENT DOCUMENTS

| | | |
|---|---|---|
| 7,782,461 B1 | 8/2010 | Massey et al. |
| 2004/0194554 A1 | 10/2004 | Nestler et al. |
| 2005/0195087 A1* | 9/2005 | Thompson ............ B67D 1/0878 340/603 |
| 2012/0242993 A1* | 9/2012 | Schick ............... G01N 21/0303 356/442 |
| 2013/0231875 A1 | 9/2013 | Beckett et al. |
| 2014/0264077 A1* | 9/2014 | Tokhtuev ................ G01N 21/49 250/226 |
| 2019/0160462 A1* | 5/2019 | Shmilovich ....... B01L 3/502715 |

FOREIGN PATENT DOCUMENTS

| | | | |
|---|---|---|---|
| CN | 110195823 A * | 9/2019 | |
| EP | 2554952 A1 | 2/2013 | |
| JP | 2008511836 A * | 4/2008 | |
| WO | 2010/112029 A1 | 10/2010 | |
| WO | WO-2013000453 A1 * | 1/2013 | ............. G01N 27/07 |
| WO | 2015/114635 A1 | 8/2015 | |
| WO | 2018/025264 A1 | 2/2018 | |
| WO | 2018125957 A1 | 7/2018 | |
| WO | 2018/235087 A1 | 12/2018 | |
| WO | WO-2019171376 A1 * | 9/2019 | ........... G01F 1/3282 |
| WO | 2020/129069 A1 | 6/2020 | |

* cited by examiner

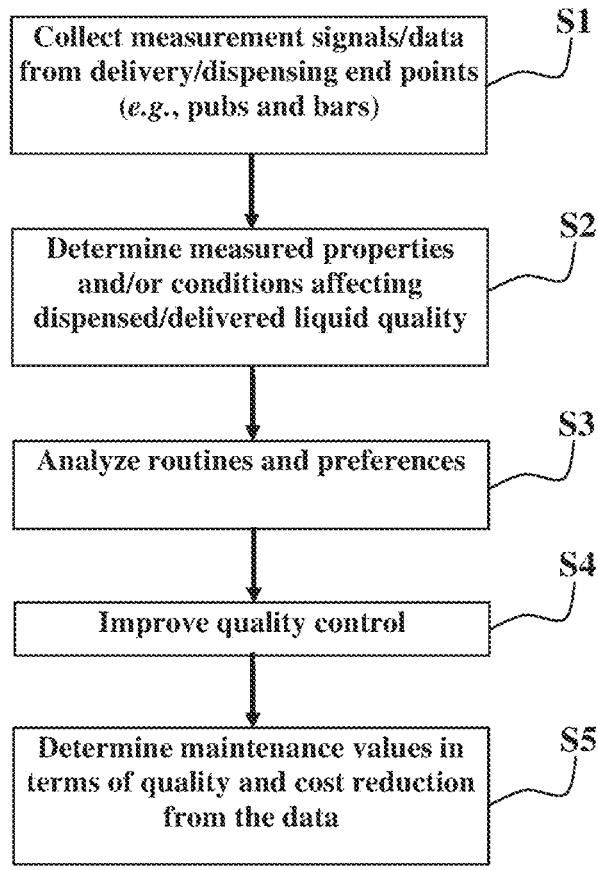
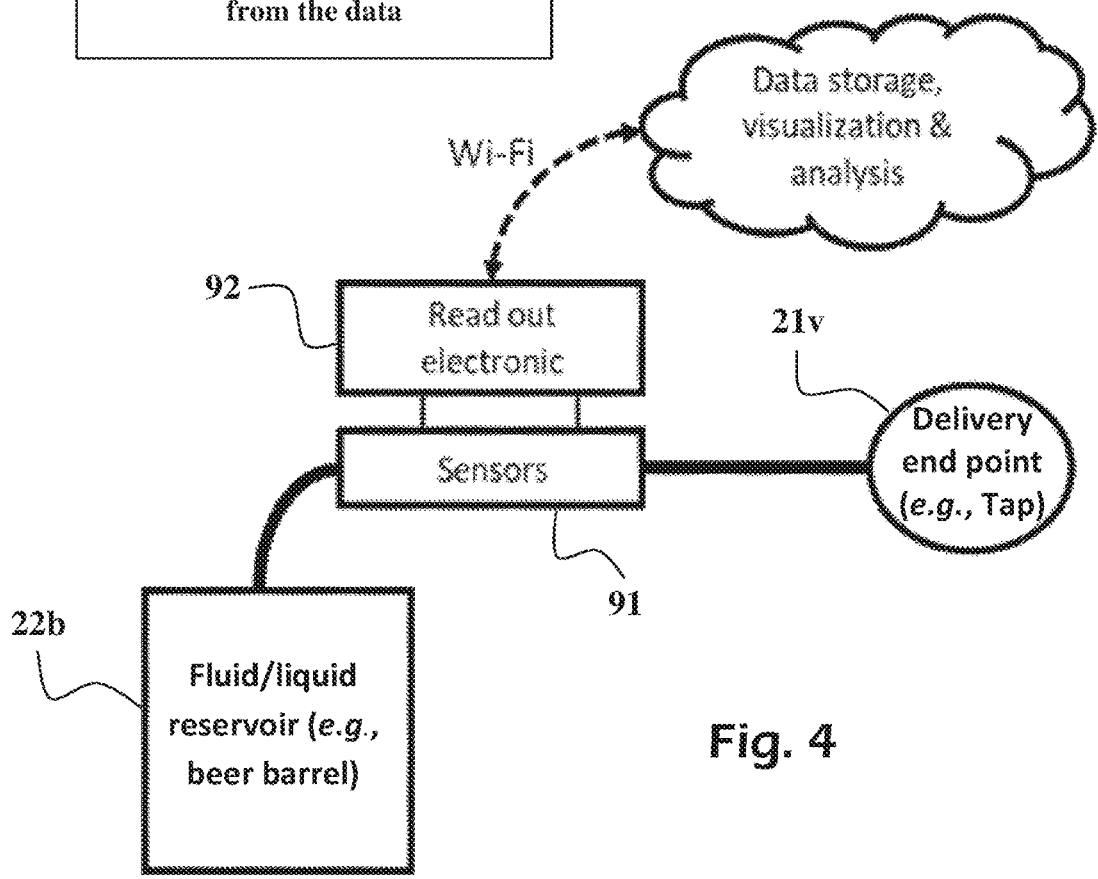

SYSTEM AND METHODS OF MEASURING PROPERTIES OF FLUIDS

TECHNOLOGICAL FIELD

The present invention is generally in the field of quality, characterization/analysis and maintenance verification in fluid dispensing/delivery systems, such as beverage dispensing systems or chemicals or water processing or delivery systems.

BACKGROUND

The quality of dispensed/delivered fluids e.g., filled or served beverage in a bar, or a restaurant, or chemicals or water used in agriculture or other industrial processes, is affected by various factors associated with the process, storage, environmental and maintenance and dispensing/delivery properties/conditions. There is a need for monitoring systems for improving the dispensing/delivery conditions and maintenance of dispensed/delivered fluids, that can guarantee provision of the dispensed/delivered fluids at the required quality and state (e.g., beverage appearance, taste and flavour, or water quality, or chemical quality) as intended by the manufacturer or user. As there is a long way from the production site to the dispensing/delivery point, the performance of the dispensed/delivered fluid is affected by various different parameters. For the specific example of beverage sector, several types of beverages (e.g., beer and juices) are more sensitive to storage and dispensing conditions and their performance can be affected dramatically by different factors.

GENERAL DESCRIPTION

The present application provides systems and methods for monitoring maintenance and dispensing/delivery of fluids (e.g., beverages, water, chemical, gases) to ensure that the fluid is dispensed with proper properties as the producer or user intended. For example, in beverage dispensing systems, the monitoring systems disclosed herein can be used to reduce and optimize cleaning cycles/procedures of beverage dispensing systems, thereby to reduce downtime, improve the performance and maximize profits. As another example, in semiconductor 'wet' systems, the monitoring systems disclosed herein can be used to analyse the liquid inside the pipe (e.g., water, recycled water, acids, etc.), and its condition. In water delivery system, such as used in agriculture or specially in greenhouses or hydroponic systems, the monitoring systems disclosed herein can be used to monitor the performance, efficiency of the process, by the analyses of multiple physical parameters which represent the status of the process. Other examples include the process monitoring in photobioreactors systems, desalination plants, bioreactors for pharma applications.

In general, the monitoring systems disclosed herein are configured to measure pressure, flow rate, electrical conductivity, temperature, turbidity and/or spectroscopy, viscosity and/or pH level of a liquid/fluid inside a dispensing/delivery system. Optionally, the monitoring system can be configured to further measure vibrations and/or acoustic signals propagating in the monitored fluid e.g., utilizing membrane of the pressure sensor, and/or by a dedicated sensor. Such measured vibration can be used to identify system malfunctions and for preventive system maintenance e.g., pump malfunction, and or identify loosen parts. The collected measurement signals/data are processed and analyzed to determine the quality of fluid maintenance, the quality of the maintained fluid, and for devising improved maintenance (e.g., Clean-In-Place (CIP) procedure) and/or dispensing/delivery procedures. This way the performance, appearance, and quality (e.g., beverage taste, color, and/or texture, water quality, chemical concentration, etc.) of the dispensed/delivered fluid can be optimized to guarantee required results.

The embodiments disclosed herein can be used to implement a system for monitoring properties and/or conditions of a fluid in a dispensing/delivery system. The system comprising one or more sensor units configured to couple to fluid delivery of maintenance components of the dispensing/delivery system, measure various different properties and/or conditions of the fluid and/or of the solution within the dispensing/delivery system (e.g., cleaning solutions, chemical concentration, fertilizer concentration), and generate measurement data indicative thereof, and a control unit configured to process and analyze the measurement data and generate based thereon indications indicative of a quality of the fluid and/or control signals for improving maintenance conditions of the fluid and/or of the dispensing/delivery system. The various different properties and/or conditions measured by the system may comprise pressure, flow rate, electrical conductivity, temperature, turbidity and/or spectroscopy, color, viscosity and/or pH level of the beverage/fluid, vibrations propagating in the monitored fluid, and/or of any other fluid within the dispensing/delivery system (e.g., water, cleaning solutions).

The system can comprise a communication interface configured to communicate the measurement data to a smart device (e.g., mobile phone, tablet, personal assistance device), dedicated device or controller, remote computer or a cloud application. The remote computer or the cloud application can be configured to collect the measurement data from a plurality of fluid/liquid monitoring systems and determine based thereon adjustments to maintenance and/or dispensing/delivered procedures for said plurality of systems. Optionally, but in some embodiments preferably, the system comprises artificial intelligence (AI) modules at the remote computer (or cloud application) for identifying maintenance and/or dispensing quality measurable conditions and/or properties that improve, or deteriorate, the quality of the maintained/dispensed beverage. Optionally, but in some embodiments preferably, the system comprises a local processing module, with or without AI capabilities, with or without the need for remote computer or cloud connectivity for fast and local data processing, to allow fast response, low latency or on places with connectivity limitations.

One inventive aspect of the subject matter disclosed herein relates to a multi-sensor device for monitoring in real time a fluid substance. The device comprises a main body structure having at least one fluid port and fluid passage for receiving a stream of the fluid substance and flowing it through the fluid passage, and one or more openings for establishing fluid communication with the fluid passage, and a sensing assembly attached to said main body structure, said sensing structure comprising a sensing foil/film having one or more sensor elements, wherein each portion of the sensing foil/film having at least one of the sensor elements is in fluid communication with at least one of the openings, to thereby enable the sensing element to measure at least one property of condition of the fluid and generate sensor data/signals indicative thereof. The main body structure and the sensing assembly attached to it constitute an integrated component configured as an insertable and removable/exchangeable element of the device.

The device comprises in some embodiments a circuit board configured to establish electrical contact with the sensor elements of the sensing foil/film, receive and process the sensor data/signals thereby generated, and generate measurement data indicative thereof.

The device can comprise at least one optical sensor optically coupled to the main body structure and electrically connectable to the circuit board, and configured to measure optical signals reflected from, and/or transmitted through, the fluid substance inside the fluid passage of the main body structure. The optical sensor is mounted in the enclosure structure of the device, and configured for optically coupling with the main body structure upon insertion of the main body structure with the sensing assembly attached to it, into the enclosure structure.

The sensing assembly of the device comprises in some embodiments a base element sandwiched between the main body structure and the sensing film/foil. The base element can be provided with a respective pass-through hole for each one of the openings in the main body structure for fluidically communication between the openings and the portions of the sensing foil/film having the sensor elements.

The sensing foil/film comprises in some embodiments at least one electrode extending from a surface of the sensing foil/film and configured to pass through one of the openings in the main body structure, contact the fluid substance inside the fluid passage, and measure at least one electrical property of the fluid substance.

The sensing elements of the sensing foil/film can be configured to implement at least one pressure sensor, and/or at least one flow sensor, and/or at least one vibration and/or acoustic signals censor, and/or at least one temperature sensor. In some embodiments the at least one pressure sensor is configured to measure acoustical vibrations in the monitored fluid (e.g., for data communication and/or preventive system maintenance).

The flow sensor is implemented in some embodiments as a differential pressure sensor affected by a first fluid pressure directly communicated to one side of the sensing film/foil through at least one of the openings of the base body structure, and by a second fluid pressure indirectly communicated to another side of the sensing film/foil through at least another one of the openings of the base body structure. The pressure or flow sensor can be implemented by sensor elements located in overlapping surface areas at opposite sides of the sensing film/foil. Optionally, the temperature sensor is configured to sense temperature of the fluid substance transferred thereto through the sensing film/foil.

The sensing assembly of the device can comprise a cover element configured to attach to the base element with the sensing film/foil sandwiched therebetween. The sensing film/foil comprises in some embodiments at least one aperture configured to establish fluid communication with one of the openings in the main body structure through a respective pass-through bore in the base element. The cover element can comprise at least one channel configured to establish fluid communication between the at least one aperture in the sensing film/foil and an underside surface area of the sensing film/foil having at least one of the sensing elements. The fluid passage inside the main body structure can comprise at least one constriction configured to cause increased pressure conditions in the at least one channel of the cover element.

A system for monitoring propertied and/or conditions of a fluid in a fluid dispensing/delivery system can comprise one or more of the sensor devices disclosed herein configured to couple and/or integrate into a fluid dispensing system, measure various different properties and/or conditions of the fluid, and/or of other fluids within the dispensing delivery system, and generate measurement data indicative thereof, and a control unit configured to process and analyze the measurement data and generate based thereon indications indicative of a quality of the fluid and/or control signals for improving maintenance conditions and/or performance of the fluid and/or of the dispensing delivery system. The various different properties and/or conditions can comprise pressure, and/or flow rate, and/or electrical conductivity, and/or temperature, and/or turbidity, and/or spectroscopy, and/or viscosity, and/or vibrations propagating in the monitored fluid, and/or pH level of the fluid.

Another inventive aspect of the subject matter disclosed herein relates to method of monitoring a fluid flowing in a dispensing/delivery system. The method comprise placing the sensor device disclosed herein in fluid communication with at least one of the following: a reservoir of the fluid, pipelines connecting the reservoir to the dispensing system, and/or dispensing/delivery valves of the dispensing system, processing sensor data generated by the one or more sensor elements of the sensing foil/film, and determining based thereon quality and/or state or condition of the dispensed fluid, and generating control signals to adjust at least one property and/or condition of the dispensed fluid whenever unacceptable quality and/or state or condition of the dispensed fluid are determined. The sensor data can be indicative of at least one of the following: electrical conductivity, pressure, flowrate, temperature, pH level, color, turbidity, spectroscopy, viscosity, of the fluid, and/or vibrations and/or acoustic signals propagating in the monitored fluid.

The method comprises in some embodiments determining that the dispensing requires maintenance based on the processed sensor data. The method can comprise monitoring fluids flowing through the dispensing/delivery system during maintenance thereof, and adjusting at least one property and/or condition thereof to improve maintenance procedures. In some embodiments the method comprises determining a type of fluid flowing through the dispensing/delivery system based on the sensor data.

Other inventive aspects of this disclosure will be apparent from the following description and the accompanying drawings.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 3 is a flowchart of dispensing/delivery monitoring process according to some possible embodiments;

FIG. 4 schematically illustrates a fluid/liquid monitoring system according to yet other possible embodiments;

DETAILED DESCRIPTION OF EMBODIMENTS

Figure 1:
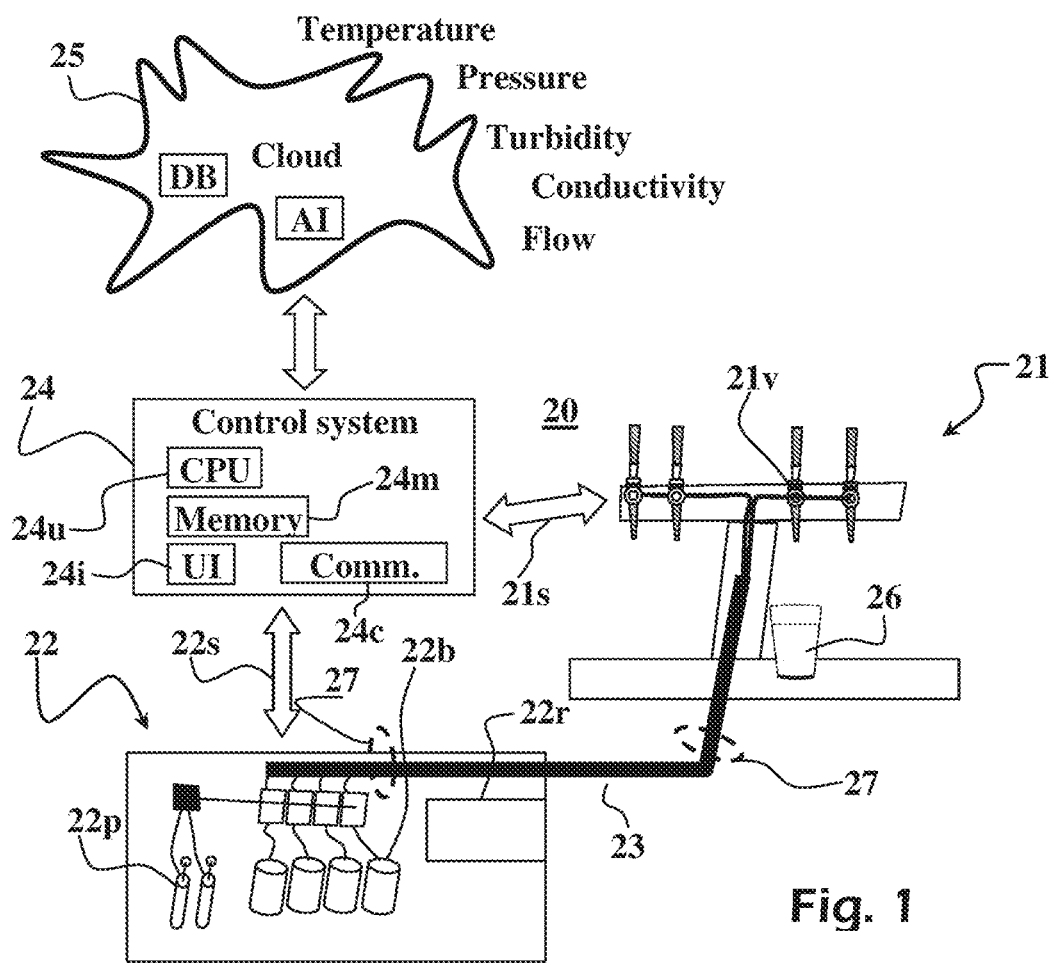
FIG. 1 schematically illustrates a liquid monitoring system according to some possible embodiments.

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the fluid monitoring techniques, once they understand the principles of the subject matter disclosed herein. This invention may be provided in other specific forms and embodiments without departing from the essential characteristics described herein.

The present application discloses techniques for real-time monitoring of properties/conditions of a fluid flowing in a fluid dispensing/delivering system, and for real-time monitoring of maintenance of the fluid dispensing/delivering system. The monitoring techniques disclosed herein are configured for incorporation in conventional fluid dispensing/delivery systems with minimal changes and intervention to the fluid dispensing/delivery system structure and function, by coupling and/or integrating sensing elements in/to conduits/tubes in which the dispensed fluid is flowing.

In some embodiments a multi-sensor device capable of simultaneously measuring various different properties (e.g., pressure, flowrate, temperature, electrical conductivity, optical properties, pH) and/or conditions of the dispensed/delivered fluid is coupled to at least one conduit/tube of the fluid dispensing/delivery system for measuring one or more properties/condition of the fluid flowing therethrough. The multi-sensor device comprises a main body having inlet and outlet ports, and a fluid passage passing therealong between said inlet and outlet ports. The multi-sensor device includes a sensing film/foil coupled to the main body and configured for measurements of at least pressure, flowrate, temperature, and electrical conductivity, of the dispensed/delivered fluid. For this purpose, the main body of the multi-sensor device can have respective openings for establishing fluid communication between the fluid passage and the sensor elements of the sensing foil/film.

The main body of the multi-sensor device comprises in some embodiments at least one opening for establishing fluid communication between the fluid passage and a portion of the sensing foil/film having a pressure sensor. The main body of the multi-sensor device comprises in some embodiments at least one opening for establishing fluid communication between the fluid passage and a portion of the sensing foil/film having a temperature sensor. The main body of the multi sensor device comprises in some embodiments one or more opening configured to introduce into the fluid passage respective one or more electrodes for measuring electrical properties (e.g., conductivity) of the dispensed fluid.

The main body of the multi sensor device comprises in some embodiments two or more openings configured to establish fluid communication between the fluid passage and a region of the sensing film/foil having a flowrate sensor. Two openings in the main body can be used for applying over the region of the sensing film/foil carrying the flowrate sensor a differential pressure drop. One of the two openings can be configured to establish fluid communication between the fluid passage and a superior region of the sensing foil/film having the flowrate sensor, and the other opening can be configured to establish fluid communication between the fluid passage and an inferior region of the sensing foil/film having the flowrate sensor via a respective opening in the sensing film/foil and a fluid channel passing inferior to the sensing film/foil.

The main body comprises in some embodiment one or more optical inspection (transparent or semi-transparent) regions configured for passage of optical signals reflected from, or transmitted through, the fluid flowing through the fluid passage towards an optical detector, for measuring optical properties of the dispensed/delivered fluid (e.g., turbidity and or spectroscopy).

The multi-sensor device comprises in some embodiments a control unit configured to receive and process sensor signals/data generated by the various different sensing elements, generate measurement data indicative thereof, and transmit (wirelessly, and/or over data communication wires) the generated measurement to one or more external devices (e.g., a smart device, computer system, remote server, cloud data center).

For an overview of several example features, process stages, and principles of the invention, the examples of fluid monitoring illustrated schematically and diagrammatically in the figures are intended for beverage dispensing systems. These beverage dispensing systems are shown as one example implementation that demonstrates a number of features, processes, and principles used to provide fluid monitoring, but they are also useful for other fluids and applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in fluid dispensing/delivering applications may be suitably employed, and are intended to fall within the scope of this disclosure.

Various beverage properties/conditions can be used to determine the quality of a dispensed beverage, particularly carbonated beverages. The beverage poured into the cup fills about half of the volume of the cup with foam, which can indicate that the beverage (e.g., beer) is over carbonated, sharp, and/or having acidic taste (carbonic acid) i.e., the quality of the dispensed beverage being deteriorated. However, these undesired properties and/or conditions of dispensed beverage can be monitored, and substantially prevented, by monitoring the temperature and/or ($CO_2$) pressure of the beverage before it is poured into the cup.

The beverage poured into the cup demonstrates a sort of opposite situation in which the beverage dispensed into the cup appears still and flat/dull (i.e., without bubbles), which may indicate a watery consistency and less aromatic smell and/or taste. These properties and/or conditions can be similarly monitored and substantially prevented by monitoring the temperature and/or pressure of the beverage to guarantee that the pressure is not too law and that its temperature is not too cold.

Finally, the beverage poured into the cup can appear cloudy or hazy and off putting, which may be indicative of unstable temperature conditions in which the beverage is maintained, dirty pipelines, and/or over aging of the dispensed beverage, which can be as well monitored and substantially prevented using the embodiments disclosed herein.

FIG. 1 schematically illustrates a monitoring system 20 configured to measure one or more properties and/or conditions of a dispensed beverage 26 for guaranteeing satisfying quality and proper maintenance thereof. In this example the beverage 26 is maintained inside a fluid reservoir 22b (e.g., stainless still barrel/keg) placed in a maintenance facility 22 having a pressure system 22p configured to maintain a desired pressure level of the beverage inside the barrels/kegs 22b, and an air-conditioning system 22r is configured to maintain a desired maintenance- or serving-temperature of the beverage 26. The beverage is streamed through pipelines 23 to the beverage dispenser system 21 for serving via one or more beverage dispensing valves 21v e.g., into cups. The monitoring system 20 comprises in some embodiments multiple sensor devices 27 configured to measure various different properties and/or conditions of the beverage 26, such as, but not limited to, one or more pressure sensors, flow and/or flow rate sensors, electrical conductivity sensors, temperature sensors, turbidity sensors, spectroscopy sensors, viscosity and/or pH sensors. In this specific and non-limiting example the sensor devices are installed, or integrated in the pipelines 23, but in other possible embodiments they are distributed in any suitable manner between the barrels/kegs 22b, pipelines 23, and the dispensing valves 21v. Optionally, but in some embodiments preferably, the different sensor devices 27 used in the monitoring system 20 are integrated together in a single device (e.g., 50 in FIGS. 6 to 12), thereby allowing easy and direct integration/deployment of many sensors in a cost effective manner, and improved performance at lower costs.

For example, and without being limiting, the sensor devices can be implemented into small chip sensor devices such as described in International Patent Publication Nos. WO 2015/114635, WO 2018/025264, WO 2019/171376, WO 2018/235087, and/or WO 2020/129069, of the same applicant hereof, the disclosure of which is incorporated herein by reference. These sensor devices can be configured to connect to the fluid pipes/conduits 23, attach to the walls of the pipes/conduits 23, barrels/kegs 22b, or valves 21v, and/or to be integrated into the walls of the pipes/conduits 23, barrels 22b, or valves 21v. In case of beer dispensing system the sensors 27 can be integrated directly into the kegs' couplers (smart coupler). In preferred embodiments the sensors 27 are implemented using plastic/polymeric materials configured to guarantee food contact compliance. Optionally, but in some embodiments preferably, the sensor devices 27 are disposable/replaceable devices that can be easily removed and replaced from time to time in order to guarantee sterilization and desirous hygiene standards.

The monitoring system 20 comprises a control unit 24 having a control circuitry (e.g., using one or more processors 24u and memories 24m) configured and operable to receive measurement signals/data from the sensor devices 27, process the measurement signals/data from the sensor devices 27, and generate maintenance data and/or indications for presentation in a user-interface (UI, e.g., display device) 24i, and/or control signals 22s configured to adjust the operation of pressure system 22p and/or of the air conditioning system 22r of the fluid maintenance system 22, to adjust the pressure and/or the temperature of the beverage maintained inside the barrels 22b. The control unit 24 is configured in some embodiments to utilize a communication module 24c to exchange data with one or more remote computers/servers 25 (e.g., control center or cloud application/data center) for collecting and processing the measurement signals/data 21s and/or maintenance data 22s, and/or indications, from a plurality of monitoring systems 20 and determining therefrom optimal maintenance conditions for each monitored beverage.

Figure 2:
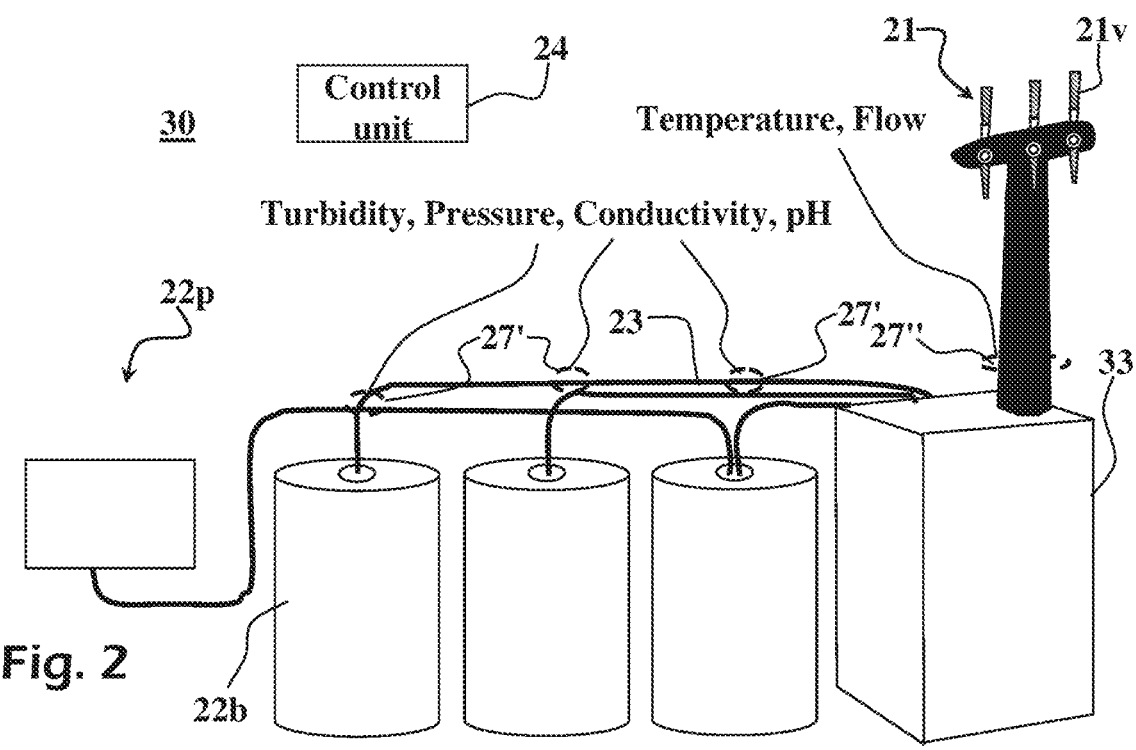
FIG. 2 schematically illustrates another liquid monitoring system according to possible embodiments.

The sensor devices 27 used in the monitoring systems shown in FIGS. 2 and 3 can be used to identify when a maintenance/cleaning (e.g., CIP—Clean-In-Place) procedures are done and their quality, and/or to issue alerts whenever a maintenance/cleaning procedure must be carried out (currently the cleaning procedure is performed every fixed time with no control if it is really needed, or if it had to be carried out therebefore). For example, a cleaning procedure can include an initial water rising step followed by cleaning with alkaline solution, a second water rising step (to clean the alkaline solution), cleaning with acid solution, and a third and final water rising step (to clean the acid solution). The sensor devices 27 of the monitoring system can be used to indicate time intervals of each of the steps in the cleaning procedure, and to determine if the right solution was used. In addition, the monitoring system can identify if the cleaning solution (e.g., alkaline or acid) was properly washed away. The temperature, pressure, and flow measurements can be also used to indicate the quality of each cleaning cycle/procedure. All this information can be used to verify that the cleaning procedure was correctly executed by the operator.

FIG. 2 illustrates an example of a beverage monitoring system 30 wherein the sensing devices 27'/27" are coupled to different parts of the system. In this specific and non-limiting example, a sensor device 27' having turbidity, spectroscopy, pressure, electrical conductivity, viscosity, and pH, sensors element, is coupled to the beverage pipes 23 of each barrel 22b, and one or more sensor devices 27" having temperature and flow rate sensor elements are coupled to the pipelines of the beverage dispensing valves 21v. This way the system 30 can directly, separately and independently, monitor the turbidity, spectroscopy, pressure, electrical conductivity, viscosity, and pH, of the beverage discharged from each one of the barrels 22b, and directly, separately and independently, monitor the flow rate and temperature of the beverage dispensed by each dispensing valve 21v. The sensor devices 27' and 27" can be attached, coupled to, or integrated in, the walls of the pipes 23 for easy and cost-effective deployment, or integrated directly into the kegs' couplers (smart coupler). The control unit 24 can collect in real-time and on-site the measurement signals/data from the sensor devices 27, and immediately process the same to generate respective indications and/or control signals.

If the beverage is maintained inside the barrels/kegs 22b in a first temperature level, and dispensed via the dispensing valves 21v at a second temperature level e.g., by means of a refrigeration unit 33, one or more temperature sensor elements (not shown) can be integrated in the sensor devices 27', and/or coupled to the barrels/kegs 22b, for monitoring the temperature of the beverage maintained inside the barrels/kegs 22b.

Optionally, but in some possible embodiments preferably, signals/data indicative of the color of served beverages (e.g., beer) is also generated by the monitoring system 20 or 30, which can be an essential component for determining the type and/or quality of the dispensed beverage. In some embodiments the optical absorbance or transmittance of the dispensed beverage is determined utilizing a tristimulus analysis at a wavelength of about 430 nm e.g., in accordance with the EBC (European brewing convention) and/or SRM (standard reference method, SRM=EBC×0.508). In some embodiments the optical absorbance or transmittance of the dispensed beverage is determined utilizing different light wavelength (simultaneously or in separated time slots) e.g., in the range of 100 nm to 2000 nm.

The monitoring system 30 can be configured to conduct real time color measurements inside the beverage dispensing system to measure the EBC color of the beverage maintained or dispensed by the system. Optionally, the color measurement can be implemented using wavelength scanning across the UV and Visible Spectrum. The EBC color changes of a beverage/fluid (e.g., beer) over time is an important parameter, which can be used to determine the age of the maintained/dispensed beverage. In addition, the EBC values (or more generally, the optical transmittance) are different for different kinds of beverages/fluid and can be used to identify the type of beverage/fluid being maintained/dispensed by the system.

The monitoring system 30 can be configured to conduct real time measurement of the beverage/fluid pressure. The beverage/fluid pressure can affect the dispensed beverage, which in this specific and non-limiting example is beer. If the pressure level maintained in the barrels 22b and/or the pipelines 23 is greater than prescribed by manufacturer's specifications a foamy beer is typically quickly dispensed out of the valves 21v, which is typically also over carbonated and will taste gassy. On the other hand, if the pressure level maintained in the barrels 22b and/or the pipelines 23 is lower than the prescribed manufacturer's specifications the $CO_2$ breaks free from the beverage (e.g., beer) as it is discharged via the valves 21v, and the beverage will eventually become flat (under carbonated). The control unit 20 can be configured to monitor and maintain the pressure in the dispensing system to guarantee that specific recommended carbonation levels, as specified by the manufacturers for their beverages (e.g., Breweries for their beers), are maintained by maintaining the pressure levels required to guarantee the desired carbonation levels in the system. The monitoring system disclosed herein can be configured to carry out real time pressure measurements and accordingly to control the carbonation of the beer inside the dispensing system for guaranteeing optimal serving conditions, as defined by the manufacturers.

The monitoring system 30 can be configured to conduct real time measurement of the beverage/fluid temperature to verify that the beverage is served by the system at the right temperature, as defined by the manufacturers. A common problem with beverage dispensing systems is dispensing the served beverage at an incorrect temperature. For example, if the temperature of the dispensed beverage (e.g., beer) is too warm it foams (approximately 25% of the dispensed beer is foam). On the other hand, if the temperature of the dispensed beverage is too cold the carbonation in the beverage (e.g., beer) stays in the beverage until it is consumed and released in the consumers' stomachs. Either way, if the beverage (e.g., beer) is too warm or too cold, the beverage's quality is at risk and profits from beverage sales will most probably decline. The monitoring system 20 (or 30) disclosed herein can be configured for real time temperature measurements inside the dispensing system for measuring and controlling the temperature of the dispensed beverage.

The monitoring system 30 can be configured to conduct real time measurement of the electrical conductivity and/or temperature of the beverage/fluid and determine based thereon the quality of the dispensed beverage. The electrical conductivity is a parameter that can be different for different types of beverages, a parameter that is related to the ingredients inside the beverage (water, minerals, chemicals) and can be used, by itself, or together with other parameters, to differentiate between different beverages, or to identify quality issues, or differentiate between different processes in the system (e.g., beverage flow vs. cleaning solution).

For example, different brands of beer have different electrical conductivity values. The electrical conductivity can reflect the presence of organic and/or inorganic substances and salts that can influence the electrical conductivity of the beverage. Similarly, rinse water also have a unique electrical conductivity value, based on the water source and treatment used, and also CIP (clean in place) solutions. Since the measured electrical conductivity changes in accordance with the temperature of the beverage, the measured electrical conductivity needs to be compensated according to the temperature measurements of the beverage, to permit accurate identification of the beverage type and/or quality related issues based on the electrical conductivity signals/data.

The monitoring system 20 (or 30) can be configured to differentiate between these different fluids based on the electrical conductivity measurements, and thereby determine if the fluid streamed through the dispensing system is a served beverage, rinsing water, or CIP solutions. This way the monitoring system 20 (or 30) can verify if the dispensing system is properly maintained to guarantee dispensing of the beverage in optimal conditions/quality. For example, the control unit 24 can be configured and operable to verify that cleaning procedures of the dispensing system are conducted properly according to the measured electrical conductivities and/or pH and/or spectroscopy and/or turbidity of the fluids streamed through the system and their time intervals. The control unit 24 can be further configured to determine if residues of CIP solutions are present in the dispensing system based on the electrical conductivity and/or pH and/or spectroscopy and/or turbidity measurements, after each cleaning procedure is performed.

It is noted that the measured electrical conductivity of a fluid is related to the pH level of the measured fluid, and thus can be further exploited for determining the pH level of a beverage, or another fluid, streamed in the dispensing system. However, as described above, in some embodiments pH sensor elements are used to determine the pH level of the beverage in the dispensing system. In beers, for example, the quality of the beer can be determined based on the measured pH level, since the pH level of the beer determines its flavor and taste. Various beers have different pH levels which influences their flavor e.g., dark malts tend to have lower and more acidic pH levels. In fact, slight pH differences can affect the hop components and the bitterness of the flavor. The monitoring system 20 (or 30) disclosed herein can be used for real time electrical conductivity and/or pH measurements inside the dispensing system for determining the quality of the beverage and tracking the cleaning processes.

The monitoring system disclosed herein can further conduct real time flow measurements inside the dispensing/delivery system. The monitoring system 20 (or 30) can be configured to detect the amount of foam on top of the dispensed beverage, and to reduce the need to purge the lines and waste beverage/beer. For example, and without being limiting, the amount of the foam in the dispensed beverage can be determined by combining different parameters measured by the monitoring system. In some embodiments the pressure and temperature measurements are continuously monitored while dispensing the beverage in order to identify inconsistencies in the flow of the dispensed beverage.

When the system is dispensing foam, changes are expected in various different measured properties, such as, for example, flowrate, pressure, turbidity, electrical conductivity, and temperature. For example, the measured electrical conductivity of the monitored fluid can be used to identify when the system is dispensing foam, because when foam is being dispensed the measured electrical conductivity is expected to be reduced. The measured turbidity, or spectroscopy values, of the monitored fluid can be also used to identify the dispensing of foam (the foam typically has a different light transmittance than the dispensed beverage e.g., beer).

Optionally, in some other embodiments, the monitoring system utilizes the determined quantity of dispensed beverage to compute the amount of dispensed foam. In addition, the foam has different characteristics than the dispensed liquid, e.g., pressure or temperature, so pressure and/or temperature measurements can be also used to quantify the amount of dispensed foam.

The measuring of the various different properties and/or conditions and recording the same at a remote system (e.g., remote servers, database system, and/or in the cloud), as exemplified in FIG. 2, can be exploited to implement advanced data processing techniques on the collected data, for optimizing the beverage maintenance and/or dispensing of the system. For example, the collection of measurement signals/data from a plurality of dispensing systems can be used to develop a beverage quality database (DB) that can be used to qualify the beverages served at different locations. This enables development of internet-of-beverages/fluids (e.g., internet-of-beer) applications that can be used to rate public drink places. In some embodiments artificial intelligence (AI) tools/procedures are used to analyze the measurement signals/data collected from the different dispensing/delivery systems for improving the maintenance and dispensing quality, and for identifying measurable conditions and/or properties that improve, or deteriorate, the quality of the maintained/dispensed beverage.

FIG. 3 is a flowchart illustrating a quality optimization process according to some possible embodiments. In step S1 the measurement signals/data (21s) is collected from the various monitoring systems (20,30) that communicates their measurements to the central control system (24,25). The collected measurement signals/data is processed and analyzed in step S2 to determine measured properties and/or conditions that affect the quality of the dispensed/delivered fluid (e.g., beverage). In step S3 analysis routines and preferences are used by the systems for fluid (e.g., beverage) maintenance, system cleaning, and other routine procedures thereof. Step S4 determines based on the different analysis and data processing improved quality control procedures for the different fluid dispensing/delivery systems from which the signals/data been collected. In step S5 maintenance values are determined in terms of quality and costs reduction from the data. The products of these data analysis and processing steps can be then communicated to the various fluid monitoring systems for improving their fluid (e.g., beverage) maintenance and/or dispensing/delivery procedures.

There is a long way from the manufacturer (e.g., brewery) to the end client (serving cup), and many parameters are involved in the dispensing process, which may change the quality (e.g., taste) of the supplied fluid (e.g., served beverage). By collecting data from different measurement points/systems (e.g., bars, pubs) in the tap system the manufacturer can discover exactly what is happening, identify quality issues, measure and analyze routines and preferences and suggest optimization. The present disclosure provides easy deployment of many sensor elements in a fluid (e.g., beverage) dispensing/delivery system in a cost-effective manner to ensure quality control and the reproducibility of the beverage served at different sites. More generally, the present disclosure provides easy deployment of many sensor elements for monitoring dispensing/delivery of any fluid/liquid system.

FIG. 4 is a block diagram illustrating integration of dedicated sensor elements 91 with dedicated readout electronics 92 in a monitoring system according to some possible embodiments for testing and characterization of a fluid/liquid (e.g., beverage) delivery/dispensing in the system. Such systems, and the other embodiments disclosed herein, can be used to design and develop cloud-based software applications/tools for data storage, visualization and analysis (e.g., internet-of-things—IoT hub, data panel). Optionally, but in some embodiments preferably, AI modules are also integrated into the system to identify irregularities.

Figure 5:
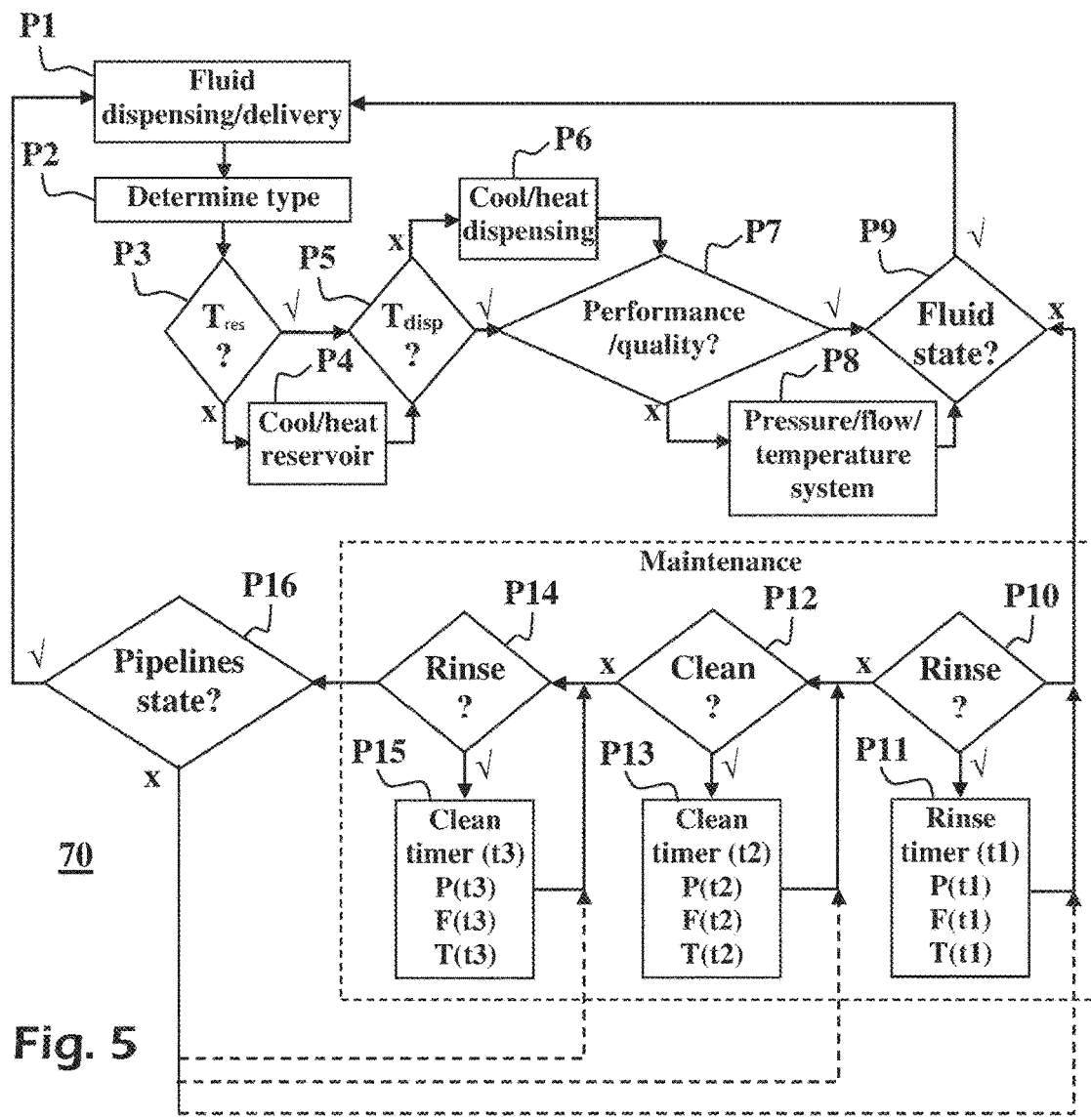
FIG. 5 is a flowchart exemplifying a fluid dispensing/delivery process according to possible embodiments.

FIG. 5 shows a flowchart of a fluid dispensing monitoring process 70 according to some possible embodiments. The monitoring can start whenever fluid dispensing/delivery is carried out in step P1. As the fluid is being dispensed/delivered through the pipelines the monitoring system (20, 30) can analyze in step P2 the sensor data from the various different sensors to determine the type of dispensed/delivered fluid (e.g., according to the readings from the optical, pH, and/or electrical conductivity sensors). The system can check in step P3 the temperature of the fluid inside the fluid reservoir ($T_{res}$), and generate corresponding control signals in step P4, to the air-conditioning system of the fluid reservoir, to cool, or heat the fluid, if so needed. The system can check in step P5 the temperature of the fluid flowing through the dispensing system ($T_{disp}$), and generate corresponding control signals in step P6 to the refrigeration/cooling/heating unit of the dispensing system to cool, or heat, the dispensed fluid, if so needed.

The monitoring system can check in step P7 the performance and/quality of the monitored fluid e.g., amount of foam, and/or bubbles, in the dispensed fluid (e.g., according to the readings from the optical sensor, electrical conductivity sensor, pressure sensor, and/or flow sensor), and generate corresponding control signals in step P8, to the pressure system of the fluid reservoir, to increase, or decrease the fluid pressure, or to other components of the system to adjust other parameters such as flow, and/or temperature, and/or adjusting the turbidity, and/or the pH level, and/or the electrical conductivity, of the monitored fluid, if so needed. The system can check in step P9 the state/condition of the dispensed state, which may be carried out regularly (e.g., every hour, every day, week/month, or several times each day/week/month), and/or whenever a certain amount of the fluid been delivered, and/or upon identification of unacceptable measured properties/conditions of the dispensed fluid (e.g., too high, or low temperature). The state/condition of the fluid can be determined based on the sensor data generated by the optical sensor and/or the electrical conductivity sensor. If it is determined in step P9 that the dispensed fluid is in good state/condition, the control is passed to step P1, for the fluid dispensing/delivery process to proceed.

If it is determined in step P9 that the dispensed fluid is not in good state/condition, the system can issue indications/alerts that system maintenance is required, and pass the control is to the maintenance steps P10 to P15, whenever system's operator perform the maintenance. The system can check in step P10 if the pipelines of the dispensing/delivery system are being rinsed (e.g., based on the readings from the optical, and/or pH, electrical conductivity sensors), and activate a rinse timer (t1) during the initial rinsing stage of the maintenance process. The system can further monitor the fluid pressure p(t1), flowrate F(t1), and/or temperature T(t1), during the initial rinsing stage for verification and optimization of the maintenance process The system can check in step P12 if the pipelines of the dispensing/delivery system are being cleaned by a solution and identify the type of solution (e.g., based on the readings from the optical, and/or pH, electrical conductivity sensors), and activate a cleaning timer (t2) during the pipelines cleaning stage of the maintenance process. The system can further monitor the fluid pressure p(t2), flowrate F(t2), and/or temperature T(t2), during the pipelines cleaning stage for verification and optimization of the maintenance process. The system can check in step P14 if the pipelines of the dispensing/delivery system are being rinsed (e.g., based on the readings from the optical, and/or pH, electrical conductivity sensors), and activate another rinse timer (t3) during the final rinsing stage of the maintenance process. The system can further monitor the fluid pressure p(t3), flowrate F(t3), and/or temperature T(t3), during the final rinsing stage for verification and optimization of the maintenance process.

After system maintenance is completed, the system can check in step P16 the state of the pipelines (e.g., based on the readings from the optical, and/or pH, electrical conductivity sensors). If it is determined in step P16 that further maintenance steps are required (e.g., upon detection of cleaning solution residues and/or debris), the system can decide to repeat the final rinsing steps P14-P15 of the maintenance, and recommend different time duration t3', different fluid pressure P(t3'), different flowrate F(t3'), and/or different temperature T(t3'), for these steps to obtain the desired results. Alternatively, the system can decide to repeat the cleaning steps P12-P13 and the final rinsing steps P14-P15 of the maintenance, and recommend different time durations t2' and/or t3', fluid pressures P(t2') and/or P(t3'), flowrates F(t2') and/or F(t3'), and/or temperatures T(t2') and/or T(t3'), for these steps to obtain the desired results. Alternatively, the system can decide to repeat the entire maintenance process of steps P10-P15, and recommend different time durations t1', t2' and/or t3', fluid pressures P(t1'), P(t2') and/or P(t3'), flowrates F(t1'), F(t2') and/or F(t3'), and/or temperatures T(t1'), T(t2') and/or T(t3'), for these steps to obtain the desired results.

The rinse and clean process P11-P13-P15 can be done by time or alternatively by measuring the parameters which indicates the state of the liquid flowing inside the pipe (e.g., based on the readings from the optical, and/or pH, electrical conductivity sensors) or a combination of the two. For example, during cleaning the system can verify that the conductivity reaches specific values, which could mean right concentration of the cleaning reagent, and only then the timer will start.

If it is determined in step P16 that state of the pipelines is good, the system can pass the control to step P1, for carrying out fluid dispensing/delivery.

Figure 6:
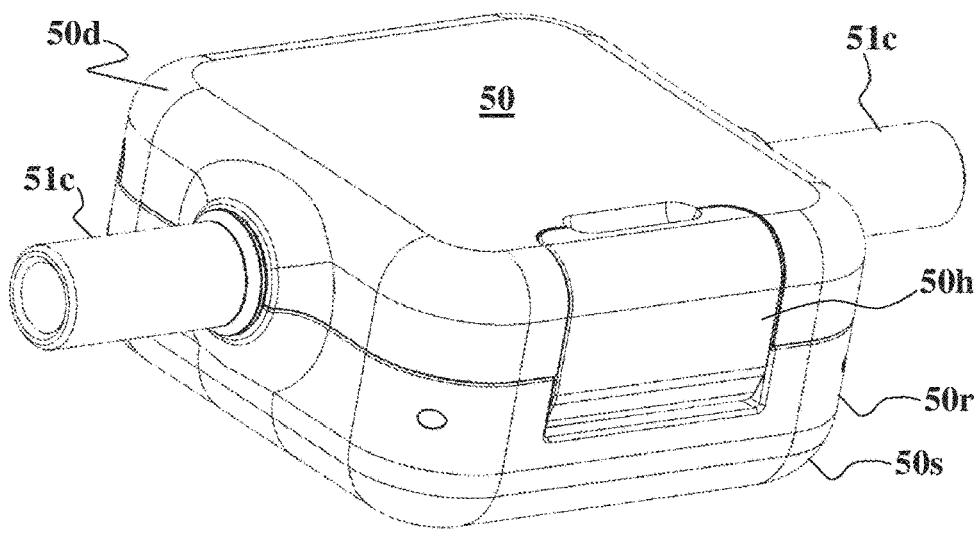
FIG. 6 schematically illustrates a multi-sensor device according to some possible embodiments.

FIGS. 6 to 12 schematically illustrate a multi-sensor device 50 designed for quick and easy integration in fluid dispensing/delivery systems, and simultaneously measuring various different properties/conditions of the dispensed/delivered fluid, and communicating data indicative thereof to external devices (e.g., smart device/phone, computer system, cloud data center, etc.). The multi-sensor device 50 can be used in any of the monitoring system embodiments disclosed herein. FIG. 6 shows the multi-sensor device 50 in a closed state, wherein its hinged lid 50d is held closed by a movable latch mechanism 50h hinged to a base package assembly comprising a top shell package portion 50r attached to a bottom shell package portion 50s. The multi-sensor device 50 comprises fluid inlet and outlet ports 51c of a main body (51 in FIGS. 7 to 12) configured for connection to a fluid pipe/conduit (e.g., of a fluid dispensing/delivery system) and measurement of properties/conditions of a fluid substance flowing therethrough.

Figure 7:
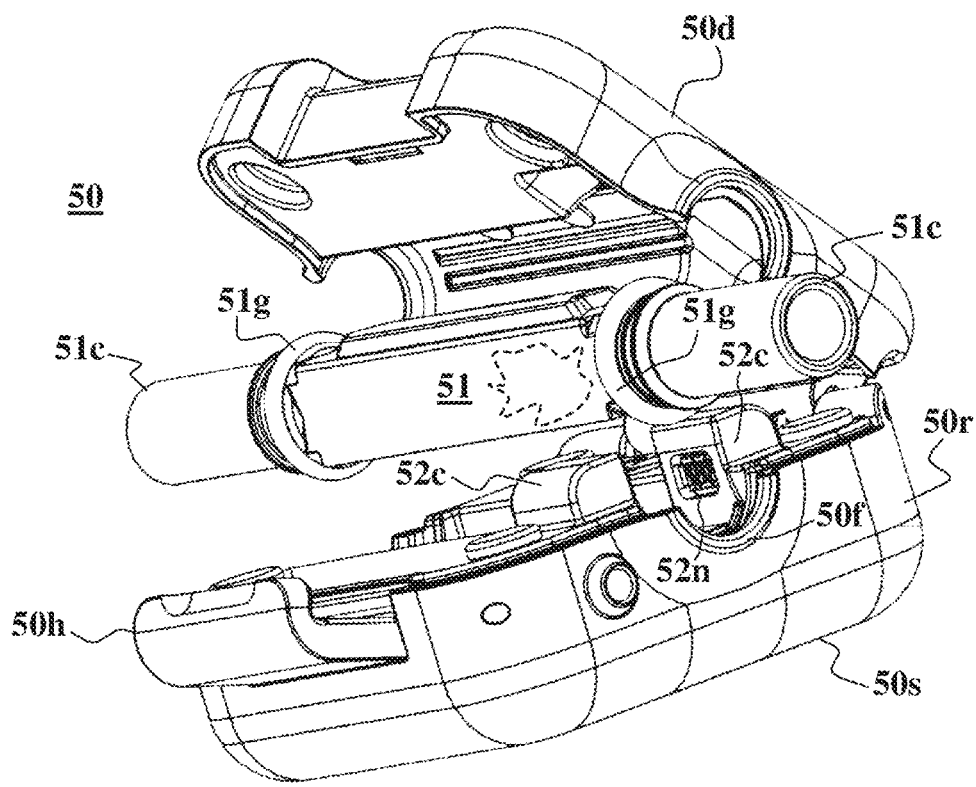
FIG. 7 shows the multi-sensor device in an open state, and with its main flow passage body elevated.

FIG. 7 shows the multi-sensor device 50 in an open state, wherein the latch mechanism 50h is removed from the lid 50d, and the lid 50d is tilt opened. As seen, in the open state, the main body 51 can be easily removed from a fastening channel 50f formed in lid 50d and the top packaging shell 50r, of the device 50. Sealing gaskets 51g placed at the bases of the inlet/outlet ports 51c can be used to seal the multi-sensor device, when main body is located in the fastening channel 50f and the lid 50d is closed thereover by the latch mechanism 50h. When the main body 51 is held by the fastening channel 50f in the closed state of the device 50, it is held immobilized adjacent to one or more optical sensor structures 52c formed in the top packaging shell 50r and configured for conducting optical measurements to the fluid flowing through the main body 51.

Each optical sensor structure 52c is configured to accommodate an optical measurement component (53s,53d in FIG. 9, e.g., a light source, such as a light emitting diode—LED, and/or corresponding light detector), and comprises at least one optical inspection window (defined by an opening, or transparent wall section) 52n, for passage of optical signals therethrough. The main body 51 comprises respective one or more optical inspection regions 51w made transparent, or semi-transparent, for passage of optical signals into its fluid passage (51a, in FIG. 12). This way, optical properties of the fluid flowing through the main body 51 can be measured. In this specific and non-limiting example, the optical properties are measured by emitting optical signals form at least one light source (53d in FIG. 9) into the fluid passage via an optical inspection region 51w at one side of the main body 51, and detecting optical signals transmitted through the flowing fluid by at least one light detector (53s in FIG. 9) via another optical inspection region 51w at the opposite side of the main body 51. In possible embodiments optical measurements of reflected optical signals are carried out i.e., the light source (53d) and the light detector (53s) are placed at the same side of the main body 51, or with a 90° angle between each other.

Figure 8:
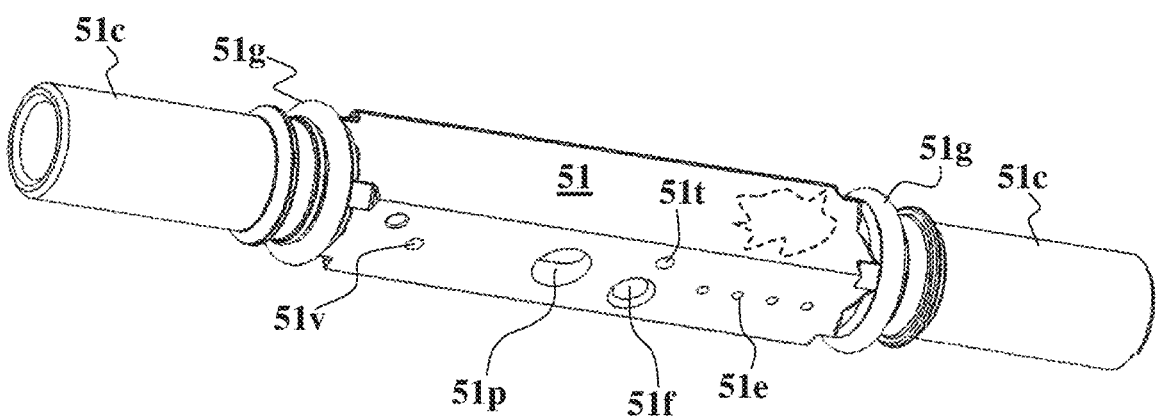
FIG. 8 shows a bottom perspective view of the main fluid passage body of the multi-sensor device.

FIG. 8 shows the bottom side of the main body 51 comprising a plurality of openings for establishing fluid communication with its internal fluid passage (51a). The main body 51 comprises one or more opening 51e configured for introducing respective one or more pin electrodes (56e is FIGS. 9, 10-12) into the fluid passage (51a). In this specific and non-limiting example four electrodes (56e) are used to measure electrical properties of the fluid flowing through the main body 51. For example, one pair of the electrodes (56e) can be used to stream an electric current through the flowing fluid, and the other pair of electrodes (56e) can be used to measure the electrical voltage evolving therebetween. This way electrical conductance/resistance of the fluid flowing through the main body 51 can be determined.

The main body 51 comprises one or more openings 51f configured to establish fluid communication with the internal fluid passage (51a) and a region of the sensing foil/film (56 in FIGS. 9, 11-12) having a pressure sensor (56f). In this specific and non-limiting example, a single opening 51f is used for fluidically communicating with the pressure sensor (56f).

The main body 51 comprises one or more openings 51t configured to establish fluid communication with the internal fluid passage (51a) and a region of the sensing foil/film (56) having a temperature sensor (56t). In this specific and non-limiting example, a single opening 51t is used for fluidically communicating with the temperature sensor (56t).

The main body 51 comprises two or more openings 51p, 51v configured to establish fluid communication with the internal fluid passage (51a) and a region of the sensing foil/film (56) having a flowrate sensor (56p). In this specific and non-limiting example two opening 51p, 51v are provided in the main body 51 for applying a differential pressure drop between two sides of the flowrate sensor (56p), as will be described in details hereinbelow with reference to FIG. 12.

Figure 9:
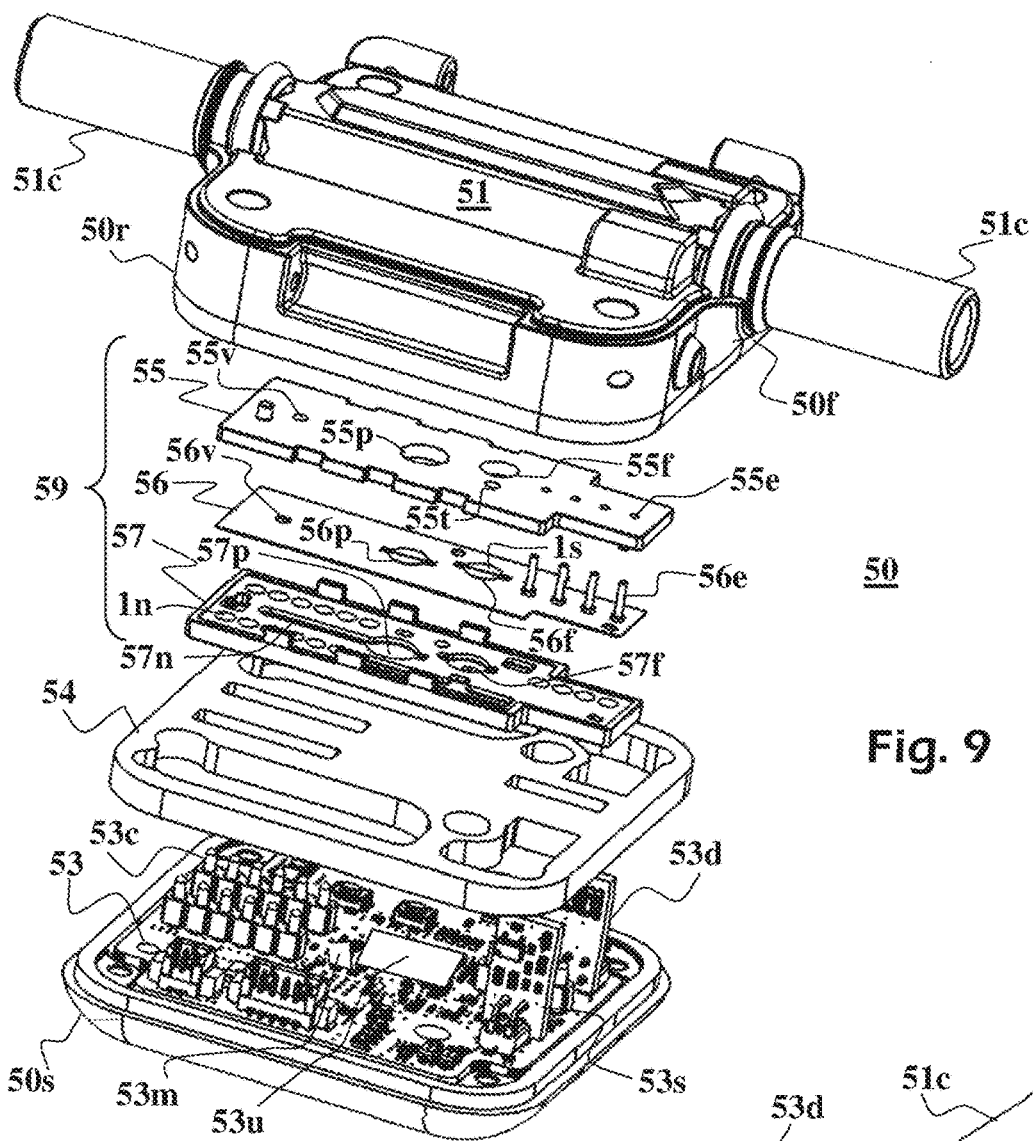
FIG. 9 shows a top perspective exploded view of the multi-sensor device.

FIG. 9 shows an exploded view of various elements of the multi-sensor device 50. The top packaging shell 50r is shown with the main body 51 fitted in its fastening channel 50f portion, and the bottom packaging shell 50s is shown with the circuitry (e.g., printed circuit board) 53 of the multi-senor device 50 fitted therein. The circuitry 53 is configured to receive sensor data/signals from the various sensor elements of the device 50, and generate measurement data indicative thereof. The circuitry 53 comprises the at least one optical light source and at least one light detector circuitries 53d,53s vertically extending therefrom, contactors 53c vertically extending therefrom for establishing electrical contacts with the sensor elements of the sensing foil/film 56 (via contact pads 1p shown in FIG. 11), and a control unit 53u configured to receive and process the sensor data from the sensing elements, and generate measurement data indicative thereof.

The circuitry 53 comprises a communication module 53m configured to exchange data (wirelessly e.g., by WiFi or Bluetooth, and/or over data communication wires e.g., using USB or RS485) with external devices (not shown). The circuitry 53 can include a power source (not shown e.g., battery and/or radiation energy harvesting unit) for powering the multi-sensor device 50.

A sealing element 54 (e.g., made of a soft material e.g., silicone, rubber, or suchlike), having openings for passage of the contactors 53c and optical sensor circuitries 53s,53d therethrough, is sealably placed over the circuitry 53 to substantially prevent passage of fluid substance from the main body 51 to the circuitry 53, in case of leakage. A sensing assembly 59, comprising: a cover element 57; the sensing film/foil 56; and a base element 55, is sandwiched between the sealing element 54 and the main body 51, wherein the sensing film/foil 56 is sandwiched between the base and cover elements 55,57. The base element 55 is configured to facilitate the fluid communication with the internal fluid passage (51a) of the main body 51 the via pass-through bores formed therein. Particularly, the base element 55 comprises: one or more respective pass-through bores 55e for fluidically communicating with the one or more openings 51e provided in the main body 51 for the pin electrodes 56e; a respective pass-through bore 55f for fluidically communicating with the opening 51f provided in the main body 51 for the pressure sensor 56f; a respective pass-through bore 55t for fluidically communicating with the opening 51e provided in the main body 51 for the temperature sensor 56t; and respective pass-through bores 55v,55p fluidically communicating with the openings 51v, 51p provided in the main body 51 for the flowrate sensor 56p.

When the sensing film/foil 56 is attached to the base element 55, the pin electrodes 56e vertically extending from the sensing film/foil 56 are passed through the respective pass-through bores 55e provided in the base element 55, the pass-through bore 55t is sealed by the portion of the sensing film/foil 56 comprising the temperature sensor (56t in FIG. 11), a sealed top pressure measurement cavity is formed at 55f when the portion of the sensing film/foil 56 comprising the pressure sensor 56f covers the bottom side opening of the pass-through bore 55f, a sealed top flowrate measurement cavity is formed at 55p when the portion of the sensing film/foil 56 comprising the flowrate sensor 56p covers the bottom side opening of the pass-through bore 55p, fluid communication is established when the aperture 56v formed in the sensing film/foil 56 is aligned about the pass-through bore 55v.

Figure 10:
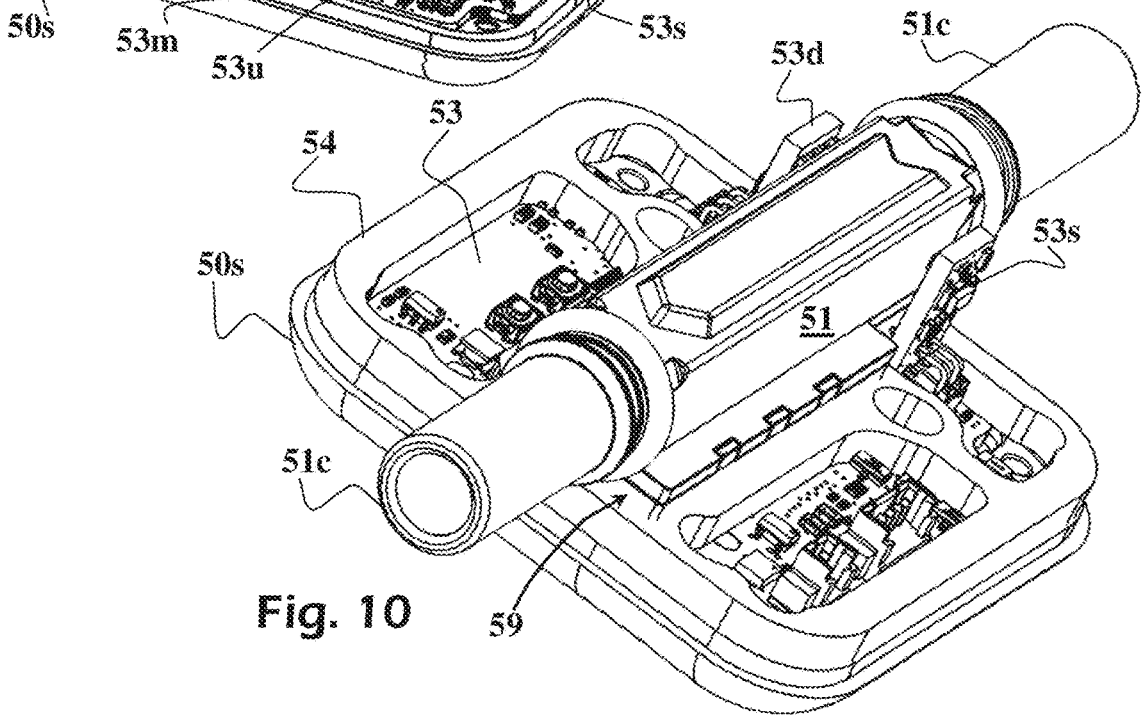
FIG. 10 shows the multi-sensor device without its lid and top packaging shell.
Figure 11:
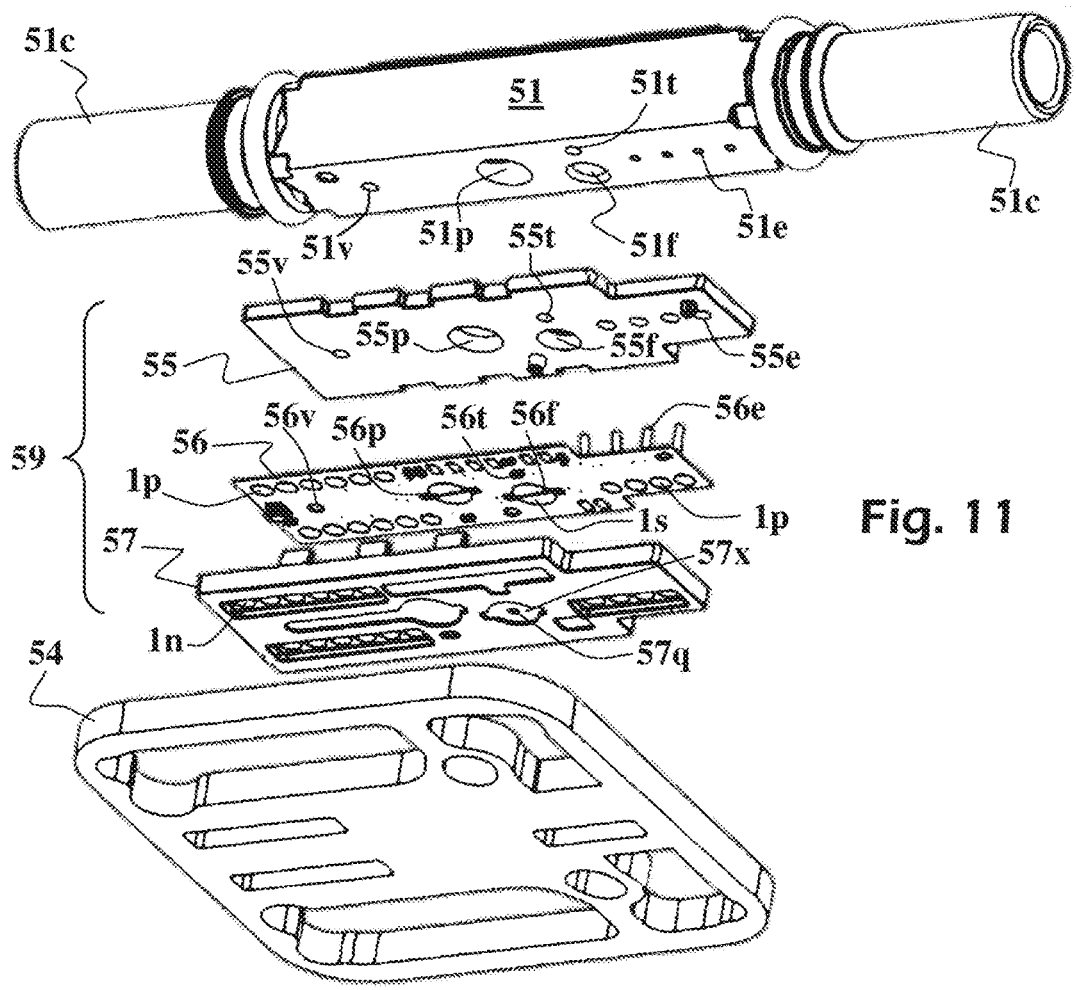
FIG. 11 shows a bottom exploded perspective view of elements of the multi-sensor device.

When the cover element 57 is attached to the sensing film/foil 56 a bottom pressure measurement cavity 57f is formed when the cavity 57f formed in the cover element 57 is attached over the portion of the sensing film/foil 56 comprising the pressure sensor 56f, a sealed bottom flowrate measurement cavity 57p is formed when the cavity 57p the cover element 57 is attached over the portion of the sensing film/foil 56 comprising the flowrate sensor 56p, and fluid communication is established between the bottom flowrate measurement cavity 57p and the aperture 56v in the sensing foil/film 56 via the fluid channel 57n formed in the cover element 57. The top and bottom pressure measurement cavities 55f,57f are configured to permit inward/outward deformations of the portion of the sensing film/foil 56 comprising the pressure sensor 55f, and the top and bottom flowrate measurement cavities 55p,57p are configured to permit inward/outward deformations of the portion of the sensing film/foil 56 comprising the flowrate sensor 55f. FIG. 10 shows the elements of FIG. 9 when attached one to the other, but without the top packaging shell (50r). FIG. 11 shows a perspective exploded bottom view of the sealing element 54, the cover element 57, sensing film/foil 56, the base element 55, and the main body 51. As seen, in this specific and non-limiting example the temperature sensor 56t is mounted at the bottom side of the sensing foil 56, to prevent direct contact between the temperature sensor 56t and the fluid substance flowing through the main body 51 i.e., the upper side of the portion of the sensing film/foil 56 comprising the temperature sensor 56t is in fluid communication with the internal fluid passage (51a) of main body 51, such that the temperature of the dispensed fluid is sensed indirectly through the sensing film/foil 56.

As seen in FIGS. 9 and 10, in some embodiments each one of the pressure and flowrate sensors 56f,56p is implemented by four sensing elements is e.g., resistive transducing elements, wherein two of the four sensing elements is are located at the upper side of the sensing foil/film 56, and the other two sensing elements is are located at the bottom side of the sensing foil/film 56. The sensing foil/film 56 comprises electrically conducting lines and vias, where needed (not shown), to establish electrical connection with the contactors 53c of the circuitry 53 via the contact pads 1p. As seen, the cover element 57 comprises a plurality of pass-through bores 1*n* configured for passage of the contactors 53*c* of the circuitry 53 therethrough to contact the contact pads 1*p* in the underside of the sensing film/foil 56.

Also seen in FIG. 11, the cover element 57 can have an underside cavity 57*x* substantially aligned with the bottom pressure measurement cavity 57*f* at the upper side of the cover element 57. The underside cavity 57*x* comprises a small aperture 57*q* fluidically communicating with the upper-side cavity 57*f* in order to provide atmospheric pressure as reference pressure for the pressure sensor 56*f*.

Figure 12:
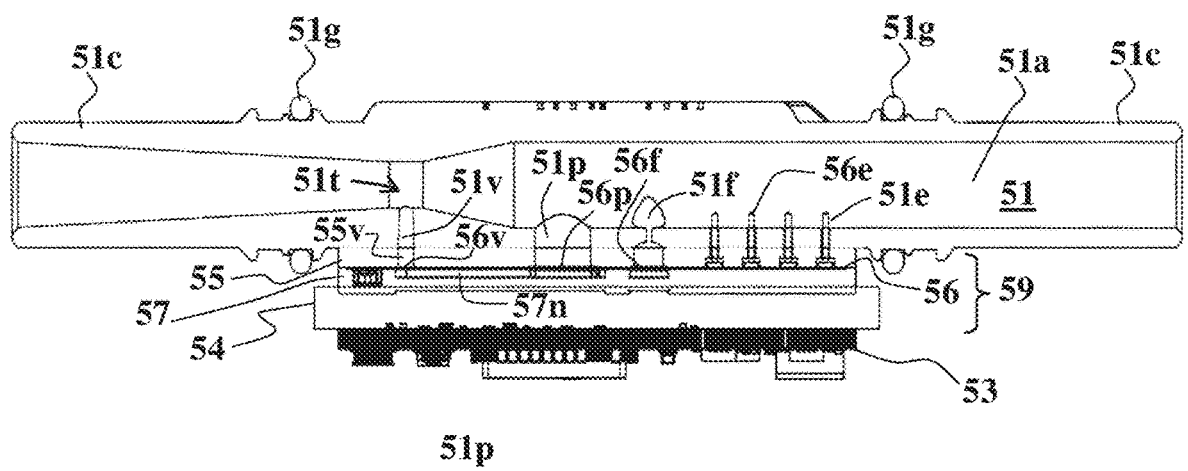
FIG. 12 shows a sectional view of the main fluid passage body and measurement elements attached to it.

FIG. 12 shows sectional view of the main body 51 assembled with the sensing assembly 59 and circuitry 53 i.e., the circuitry is in electrical contact with the sensors. As seen, the four pin electrodes 56*e* are passed via their respective pass-through bores (55*e*) and through the openings 51*e* and their free ends are introduced into the fluid passage 51*a* of the main body 51. In addition, direct fluid communication is established between the fluid passage 51*a* of the main body 51 and the upper side of the pressure sensor 56*f* through opening 51*f* and the respective pass-through bore (55*f*) in the base element 55, and direct fluid communication is established between the fluid passage 51*a* of the main body 51 and the upper side of the flowrate sensor 56*p* through opening 51*p* and the respective pass-through bore (55*p*) in the base element 55. Another direct fluid communication, which is not seen in FIG. 12, is established between the fluid passage 51*a* of the main body 51 and the portion of the sensing foil/film 56 having the temperature sensor (56*t*, through opening 51*t* and the respective pass-through bore 55*t* in base element 55, as seen in FIG. 11).

Indirect/roundabout fluid communication is established between the fluid passage 51*a* and the bottom side of the flowrate sensor 56*p* through the opening 51*v*, the pass-through bore 55*v* in the base element 55, and the upper-side channel 57*n* and cavity 57*p* of the cover element 57. This way, a differential pressure drop is established over the flowrate sensor 56*p* i.e., between the pressure in the top flowrate measurement cavity formed at 55*p* communicated through the opening 51*p* in the main body 51, and the pressure in the upper-side cavity 57*p* of the cover element 57 communicated through the opening 51*v* in the main body 51. In some embodiments the internal fluid passage 51*a* of the main body 51 comprises a constrictions 51*t* in a region comprising the opening 51*v*, to thereby cause and communicate increased pressure conditions to the upper-side cavity 57*p* of cover element 57. This way a venturi effect is achieved, and the difference between the pressures at the openings 51*p* and 51*v* is used by the control unit 53*u* to determine the fluid flowrate inside the internal fluid passage 51*a* of the main body 51 (e.g., based on the Bernoulli principle).

The cover element 57 can be manufactured from plastic/polymeric material according the application requirements e.g. (Polycarbonate, PET, PA6, Trita, etc.), by injection molding, CNC, or 3D printing. The sensing film/foil 56 can be manufactured using any of the techniques described in WO 2015/114635, WO 2018/025264, WO 2019/171376, WO 2018/235087, and/or WO 2020/129069. The electrodes 56*e* can be prepare from an electrically conducting material e.g., by stainless steel, gold, platinum, brass coated by gold, and attached to the sensing foil/film 56 by conductive glue and/or soldering. The sensing structure 59 is assembled in some embodiments by attaching the sensing film/foil 56 to the base element 55 e.g., by gluing or welding techniques (heat welding, ultrasonic welding, laser welding or similar), and thereafter attaching the film/foil 56 and base element 55 assembly to the cover element 57 e.g., by gluing or welding techniques (heat welding, ultrasonic welding, laser welding or similar).

Figure 13:
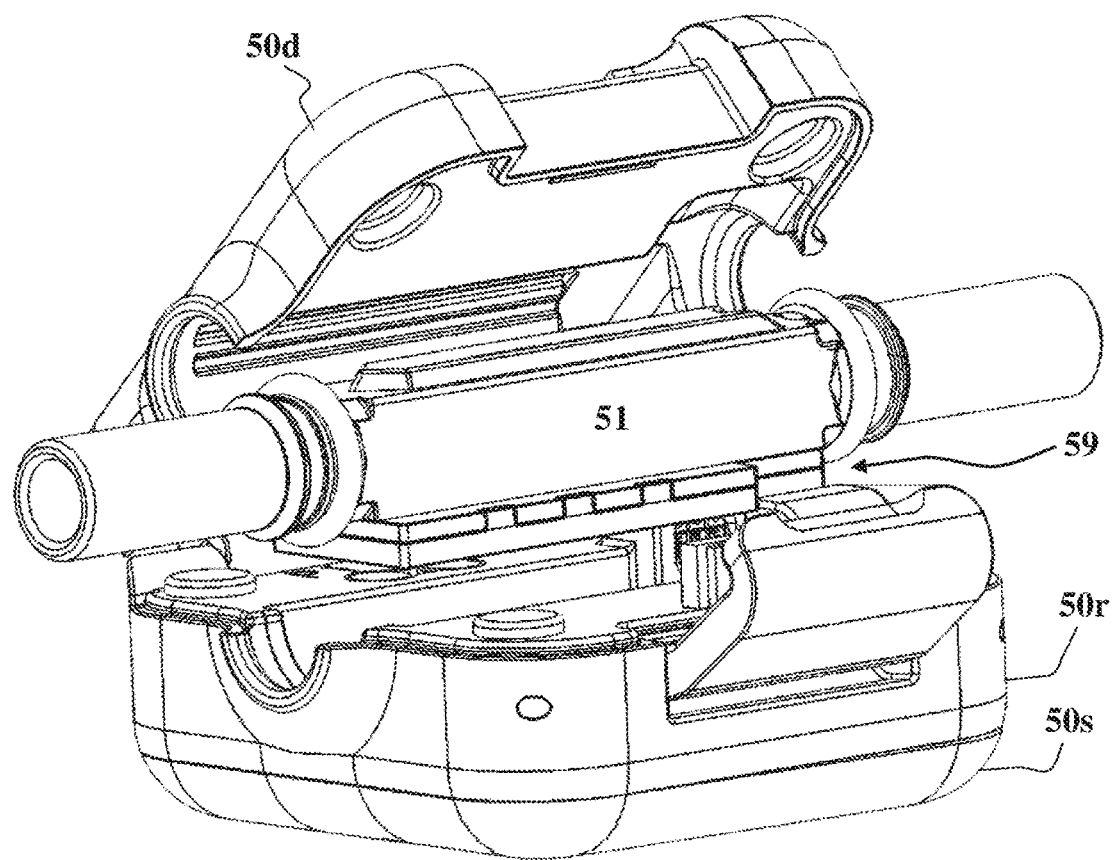
FIG. 13 shows the multi-sensor device in an open state, wherein the main body and the sensing assembly attached to it are removed from the device.

In some embodiments, the sensing assembly 59 and the main body structure 51 constitute an integrated removable element, that can be easily removed and replaced, whenever needed, as exemplified in FIG. 13.

The multi-sensor device 50 can be used in a myriad of different applications/industries requiring real-tome monitoring of a flowing fluid substance and/or monitoring fluid dispensing systems and/or the maintenance of such systems. For example, and without being limiting, in possible embodiments the components of the sensor device 50 that contact/interact with the fluid substance flowing therethrough are made of food grade materials (e.g., PET, Tritan, Polycarbonate, PA6) for enabling utilization of the sensor device 50 in the monitoring of properties/conditions (e.g., quality) and/or the dispensing/supply of liquid food products (e.g., milking facilities and/or milk products production plants, beverage products, water purification/distillation/filtration and/or supply systems), and suchlike. However, components of the multi-sensor device 50 can be manufactured from other materials (e.g., PEEK, Teflon) for operation in harsher conditions, as may be needed for monitoring various types of chemical materials (e.g., acids, solvents, fossil fuels), and/or as required in the semiconductors industries.

It should be understood that throughout this disclosure, where a process or method is shown or described, the steps of the method may be performed in any order or simultaneously, unless it is clear from the context that one step depends on another being performed first.

As described hereinabove and shown in the figured, the present application provides monitoring system and device for monitoring a flowing fluid in a fluid dispensing system, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A multi-sensor device for monitoring a fluid substance, said multi-sensor device comprising:
   a main body structure having at least one fluid port and a fluid passage for receiving a stream of said fluid substance and flowing it through said fluid passage, and one or more openings for establishing fluid communication with said fluid passage;
   a sensing assembly attached to said main body structure, said sensing assembly comprising:
     a base element attached to the main body structure, said base element having a respective pass-through hole for each of the one or more openings of the main body structure for fluidically communicating between said one or more openings and said respective pass-through hole;
     a sensing foil/film having one or more sensor elements, wherein each portion of said sensing foil/film having at least one of said one or more sensor elements is in fluid communication with at least one of said one or more openings via its respective pass-through bore, to thereby enable each of said one or more sensor elements to measure at least one property or condition of said fluid substance and generate sensor data/signals indicative thereof; and a cover element attached to the base element with the sensing film/foil sandwiched therebetween; and an enclosure assembly configured to receive said main body structure and said sensing assembly attached thereto, said main body structure and sensing assembly attached thereto configured as an insertable and removable/exchangeable element operable to electrically connect between said sensing foil/film of the sensing assembly and circuitry of said enclosure assembly.

2. The multi-sensor device of claim 1, comprising a circuit board configured to establish electrical contact with the one or more sensor elements of the sensing foil/film.

3. The multi-sensor device of claim 1, comprising at least one optical sensor optically couplable to the main body structure, and configured to measure optical signals reflected from, and/or transmitted through, the fluid substance inside the fluid passage of said main body structure.

4. The multi-sensor device of claim 3, wherein the enclosure assembly comprises a fastening channel configured to receive and hold the main body structure of said multi-sensor device, wherein the optical sensor is mounted in said enclosure assembly and configured for optically coupling with said main body structure upon insertion of the main body structure, with the sensing assembly attached to it, into the fastening channel of said enclosure.

5. The multi-sensor device of claim 1, wherein the sensing foil/film comprises at least one electrode extending from a surface of said sensing foil/film and configured to contact the fluid substance inside the fluid passage through one of the one or more openings of the main body structure, and to measure at least one electrical property of said fluid substance.

6. The multi-sensor device of claim 1, wherein the one or more sensor elements of the sensing foil/film configured to implement at least one of the following: a pressure sensor, a flow sensor, a vibration and/or acoustic signals sensor, a temperature sensor, an electrical conductivity sensor, a turbidity sensor, a pH sensor, a viscosity sensor, an optical sensor, an electrochemical sensor, and/or a dissolved oxygen sensor.

7. The multi-sensor device of claim 6, wherein the flow sensor is a differential pressure sensor affected by a first fluid pressure directly communicated to one side of the sensing film/foil through at least one of the one or more openings of the main body structure, and by a second fluid pressure indirectly communicated to another side of the sensing film/foil through at least another one of the one or more openings of the base body structure.

8. The multi-sensor device of claim 6, wherein the pressure or flow sensor is implemented by sensor elements located in overlapping surface areas at opposite sides of the sensing film/foil.

9. The multi-sensor device of claim 6, wherein the temperature sensor is configured to sense temperature of the fluid substance transferred thereto through the sensing film/foil.

10. The multi-sensor device of claim 1, wherein the sensing film/foil comprises at least one aperture configured to establish fluid communication with one of the openings in the main body structure through a respective one of the respective pass-through bore of the base element, and wherein the cover element comprises at least one channel configured to establish fluid communication between said at least one aperture in said sensing film/foil and an underside surface area of said sensing film/foil having at least one of the sensing elements.

11. The multi-sensor device of claim 10, wherein the fluid passage of the main body structure comprises at least one constriction configured to alter pressure conditions in the at least one channel of the cover element.

12. A system for monitoring properties and/or conditions of a fluid in a fluid dispensing/delivery system, the system comprising:

one or more multi-sensor devices of claim 1 configured to couple and/or integrate into a fluid dispensing system, measure various different properties and/or conditions of the fluid, and/or of other fluids within the dispensing delivery system, and generate measurement data indicative thereof; and a control unit configured to analyze and monitor the measurement data from the one or more multi-sensor devices.

13. The system of claim 12, wherein the various different properties and/or conditions of the fluid comprise pressure, and/or flow rate, and/or electrical conductivity, and/or temperature, and/or turbidity, and/or spectroscopy, and/or viscosity, and/or dissolved oxygen, and/or optical properties, and/or electrochemical properties, and/or pH level of the fluid.

14. The system of claim 12, comprising a communication interface configured to communicate the measurement data to a remote computer, said remote computer configured to collect the measurement data from a plurality of monitoring systems and determine based thereon adjustments to maintenance and/or dispensing procedures for said plurality of systems.

15. The system of claim 14, comprising artificial intelligence modules at the remote computer for analyzing the measurement data from the multi-sensor devices and identifying quality conditions and/or property of the maintained/dispensed fluid.

16. A method of monitoring a fluid flowing in a dispensing/delivery system, the method comprising:

placing the multi-sensor device of claim 1 in fluid communication with at least one of the following: a reservoir of said fluid, pipelines connecting said reservoir to the dispensing system, and/or dispensing/delivery valves of said dispensing/delivery system;

processing sensor data generated by the one or more sensor elements of the sensing foil/film, and determining based thereon quality and/or state or condition of the dispensed fluid; and generating data/signals to indicate and/or adjust at least one property and/or condition of the dispensed fluid based on the determined quality and/or state or condition of the dispensed fluid.

17. The method of claim 16, wherein the sensor data is indicative of at least one of the following: electrical conductivity, pressure, flowrate, temperature, pH level, vibration and/or acoustic signals, color, turbidity, spectroscopy, optical measurements, electrochemical measurements, viscosity, dissolved oxygen, of/in the fluid.

18. The method of claim 16, comprising determining that the dispensing/delivery system requires maintenance based on the processed sensor data.

19. The method of claim 16, comprising monitoring fluids flowing through the dispensing/delivery system during maintenance thereof, and adjusting at least one property and/or condition thereof to improve maintenance procedures.

20. The method of claim 16, comprising determining a type of fluid flowing through the dispensing/delivery system based on the sensor data.

* * * * *